United States Patent
Carlin et al.

(10) Patent No.: US 8,140,495 B2
(45) Date of Patent: Mar. 20, 2012

(54) ASYNCHRONOUS DATABASE INDEX MAINTENANCE

(75) Inventors: Peter A. Carlin, Seattle, WA (US); Per-Ake Larson, Redmond, WA (US); Jingren Zhou, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 347 days.

(21) Appl. No.: 12/435,026

(22) Filed: May 4, 2009

(65) Prior Publication Data

US 2010/0281005 A1 Nov. 4, 2010

(51) Int. Cl.
*G06F 17/30* (2006.01)
(52) U.S. Cl. ........................................ 707/696
(58) Field of Classification Search ............ 707/10, 707/200, 696; 713/200
See application file for complete search history.

(56) References Cited

U.S. PATENT DOCUMENTS

| | | | |
|---|---|---|---|
| 6,438,562 B1 | 8/2002 | Gupta et al. | |
| 7,139,783 B2 | 11/2006 | Hinshaw et al. | |
| 2002/0038313 A1* | 3/2002 | Klein et al. | 707/200 |
| 2002/0120858 A1* | 8/2002 | Porter et al. | 713/200 |
| 2005/0235003 A1 | 10/2005 | Folkert et al. | |
| 2006/0047696 A1 | 3/2006 | Larson et al. | |
| 2008/0177722 A1 | 7/2008 | Lohman et al. | |
| 2009/0210429 A1* | 8/2009 | Agrawal et al. | 707/10 |

OTHER PUBLICATIONS

Blakeley, et al., "Efficiently Updating Materialized Views", retrieved on Feb. 26, 2009 at <<http://170.210.130.9/root/public/SMOD7592/SIGMOD86/P061.PDF>>, ACM 1986, pp. 61-71.

"Business Intelligence: Indexing and statistics strategies for DB2 UDB for iSeries", , retrieved on Feb. 26, 2009 at <<http://www-03.ibm.com/servers/enable/site/bi/strategy/page_5.html>>, IBM Solution development for IBM Systems, 6 pages.

Schroeder, "Designing SQL Server non-clustered indexes for query optimization", retrieved on Feb. 26, 2009 at <<http://searchsqlserver.techtarget.com/tip/0,289483,sid87_gci1299403,00.html>>, Microsoft SQL Server 2008, Feb. 13, 2008, 5 pages.

"Setting up an Index Maintenance Regime for Oracle Text", retrieved on Feb. 26, 2009 at <<http://www.oracle.com/technology/products/text/htdocs/Index_Maintenance.html>>, Oracle Technology Network, Oct. 3, 2003, 6 pages.

(Continued)

*Primary Examiner* — Etienne Leroux
(74) *Attorney, Agent, or Firm* — Lee & Hayes, PLLC (57) ABSTRACT

This disclosure provides techniques for asynchronously maintaining database indexes or sub-indexes. For example, a database management server may receive a data manipulation statement to modify particular data stored in a database and determine whether an index associated with executing the statement is maintained asynchronously. When the index is maintained asynchronously, maintenance of the index to reflect changes made to the particular data by executing the data manipulation statement may be delayed until an index maintenance event. The index maintenance may be based on an isolation level of a transaction including a query that triggered the index maintenance.

20 Claims, 8 Drawing Sheets

OTHER PUBLICATIONS

Tsai, et al., "Self-Adjusting Indexing Techniques for Communication-Induced Checkpointing Protocols", retrieved on Feb. 26, 2009 at <<http://ieeexplore.ieee.org/ielx5/4459624/4459625/04459675.pdf?arnumber=4459675>>, 13th IEEE International Symposium on Pacific Rim Dependable Computing, pp. 306-313.

Yang, et al., "Tackling the Challenges of Materialized View Design in Data Warehousing Environment", retrieved on Feb. 26, 2009 at <<http://citeseerx.ist.psu.edu/viewdoc/download;jsessionid=451C53ED501AC31A661544C34CFBEA02?doi=10.1.1.57.5495&rep=rep1&ype=pdf>>, 10 pages.

Zhou, et al., "Dynamic Materialized Views", retrieved on Feb. 26, 2009 at <<http://research.microsoft.com/en-us/um/people/jrzhou/pub/dmv.pdf>>, 10 pages.

Zhou, et al., "Lazy Maintenance of Materialized Views", retrieved on Feb. 26, 2009 at <<http://research.microsoft.com/en-us/um/people/jrzhou/pub/LazyMaintenance_VLDB07.pdf>>, VLDB 2007, Sep. 23-28, 2007, Vienna, Austria, 12 pages.

* cited by examiner

| | Log Sequence # | Row Action | Transaction ID | Transaction Seq. # | Affected Index Set | Last Name | First Name |
|---|---|---|---|---|---|---|---|
| Delta Row 1 | 1000 | Insert | TX200 | 500 | 10101 | Larson | Paul |
| Delta Row 2 | 1100 | Delete | TX210 | 530 | 10100 | Carlin | Peter |
| Delta Row 3 | 1125 | Insert | TX210 | 530 | 10100 | Carlin | Peter |
| Delta Row 4 | 1160 | Insert | TX215 | 555 | 00100 | Zhou | Jingren |

Fig. 3

| | Physical Index ID | Sub-Index ID | Sub-Index Key Col. | LSN High WM | Last Maintenance Time | TSN High Bound | Skipped TSN List |
|---|---|---|---|---|---|---|---|
| Row 1 | 100 | 1 | Carlin | 500 | 5/5/2008 1:30 PM | 400 | null |
| Row 2 | 100 | 2 | Larson | 1160 | 5/10/2008 11:22 AM | 1160 | 500 |
| Row 3 | 100 | 3 | Zhou | 1000 | 5/8/2008 10:00 AM | 1000 | null |
| Row 4 | 125 | null | null | 1160 | 5/10/2008 9:32 AM | 600 | 400, 440 |

ASYNCHRONOUS DATABASE INDEX MAINTENANCE

BACKGROUND

Indexes may be used to speed up access to data stored in a database. An index is a data structure that is created using one or more columns of a base table of the database. To illustrate, a base table having columns including the first name, last name, and age of a number of people may be associated with an index on the last names. Thus, a search for all people having a particular last name would utilize the last name index to quickly locate rows corresponding to the search results stored in the database. Types of database indexes may include B-tree structures, a hash table, an R-tree structure, or a bitmap. Access to data stored in a database may be controlled by a database management server.

Database indexes are maintained (i.e. updated) when data in the source table of the index is modified. Index maintenance is performed to provide accurate responses to applications that retrieve data using the index. A database index is normally updated immediately when data in its source table is modified. Changes to base tables result from statements to insert, update, or delete rows in the base table. Maintaining an index immediately may be inefficient because the modifications may be unnecessary. For example, a particular row may be modified several times before the row is read when evaluating a query. In this situation, only the latest change to the row before the query is relevant. Thus, if an individual changes phone numbers several times, a query for the phone number of the individual is only interested in the current phone number and not previous phone numbers. The updates relating to the previous phone numbers may be considered unnecessary. In addition, index maintenance may occur at peak operating times of the database management server. Thus, the processing power of the database management server may be drained due to index maintenance operations.

SUMMARY

This disclosure describes techniques to maintain database indexes asynchronously. For example, a method to maintain database indexes asynchronously may include receiving a statement to modify data stored in a database table and determining whether an index on the table is an asynchronous index and if it is, delaying maintenance of the index. Maintenance of the index may be triggered by one of several events, including receiving a query utilizing the index or a low load on the database management server. In response to an index maintenance event, the index is updated to reflect any changes to the source table since the previous index maintenance event.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE CONTENTS

The detailed description is described with reference to accompanying FIGs. In the FIGs, the left-most digit(s) of a reference number identifies the FIG. in which the reference number first appears. The use of the same reference numbers in different FIG.s indicates similar or identical items.

While the features of the invention may be modified, specific embodiments are shown and explained by way of example in the drawings. The drawings and detailed description are not intended to limit the features of the invention to the particular form disclosed, and instead the intent is to cover all modifications, equivalents, and alternatives falling within the spirit and scope of the features of the invention as defined by the claims.

DETAILED DESCRIPTION

This document describes systems and methods to maintain database indexes asynchronously. Asynchronous indexes may need to be maintained when rows of the base table of the index are changed in response to a statement deleting rows of the base table, inserting rows into the base table, or updating rows of the base table. Asynchronously updating an index may improve the efficiency of index maintenance by reducing the number of inputs/outputs needed for index maintenance. Asynchronous maintenance of indexes may be particularly efficient for a database table having frequent writes, but infrequent reads.

In one illustrative example, an index may be used on a message table storing emails associated with employees of a particular business. The emails may be sent by the employees, received by the employees, or a combination thereof. When a statement to modify the message table is received by the database management server, the table is updated accordingly. To illustrate, a first employee of the business may receive an email from a second employee of the business. In response to the sending and receiving of this email, a new row is inserted into the message table storing sender email address, recipient email address, time email is sent, time email is received, subject of email, and message text. An index on the time of emails received may also need to be updated by adding a row to reflect the time that the first employee received the email from the second employee.

When an index is an asynchronous index, the maintenance of the index may be delayed until later. For example, even though changes may be made to a base table, an asynchronous index associated with the base table may remain unchanged until some later time. In one illustration, maintenance of an index may be delayed until the resources utilized by the database management server are freed up. Thus, in contrast to immediate index maintenance, asynchronous index maintenance may occur at non-peak times. In another illustration, index maintenance may be delayed until a query is received that requires access to the index. For example, a database management server may receive a query to retrieve emails received on a particular date for a particular recipient. In order to provide accurate results, any index used to access the appropriate data must be up-to-date. Consequently, the index on the time of emails received needs to be updated to include emails received between the last time the index was maintained and the receipt of the query. The query is given access to the index only after maintenance of the index. Note also that because the query is limited to emails for a particular recipient, it is sufficient to add to the index only the emails for that recipient—emails to other recipients have no effect on the query. This observation is the basis for sub-indexing, that is, allowing a maintenance operation to bring only part of an index up to date.

This brief introduction is provided for the reader's convenience and is not intended to limit the scope of the claims, nor the proceeding sections.

Figure 1:
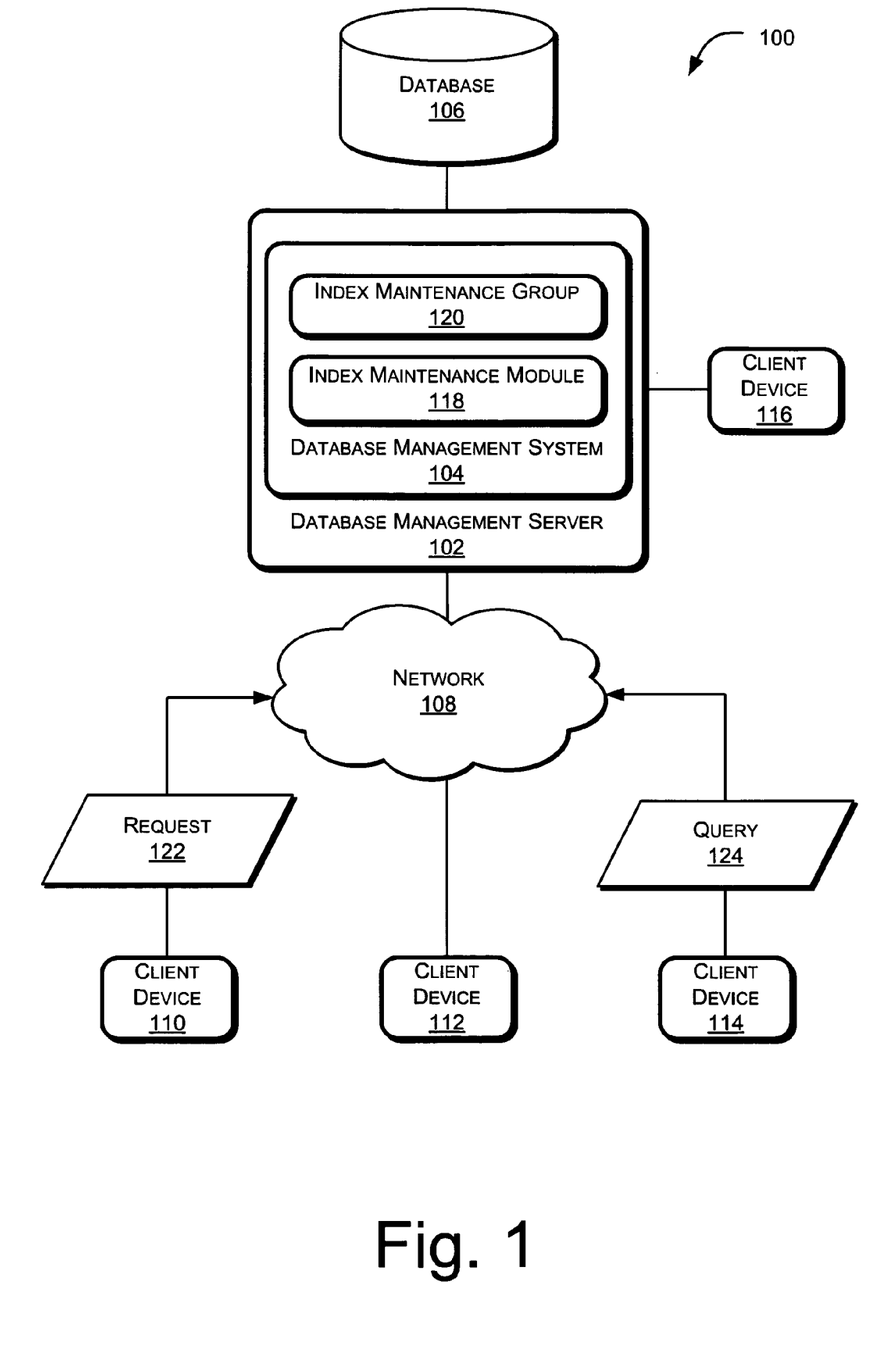
FIG. 1 illustrates a diagram of an embodiment of a system to maintain database indexes utilizing an index maintenance group and an index maintenance module.

FIG. 1 illustrates a diagram of an embodiment of a system 100 to maintain database indexes asynchronously. The system 100 includes a database management server 102. The database management server 102 includes a database management system 104 that provides access to data stored in a database 106. The database management system 104 may be a structured query language (SQL) database management system or another type of relational database management system.

The database management server 102 may include one or more processing units and memory accessible to the one or more processing units. The memory may include computer-readable storage media, such as random access memory, read-only memory, cache memory, and one or more hard disk drives. The memory may provide non-volatile storage of computer readable instructions, data structures, program modules, and other data. For example, the memory may include the database management system 104 and one or more applications that are executable by the one or more processing units to provide asynchronous database index maintenance.

The database 106 may include one or more CD-RW/DVD-RW drives, hard disk drives, tape drives, or other storage devices that are utilized to store information. Data stored in the database 106 may be organized according to one or more base tables and one or more indexes may be derived from the base tables. In addition, the one or more indexes may be subdivided into a number of sub-indexes.

The database management server 102 may be coupled to a network 108. The network 108 may include a local area network, a wide area network, such as a public switched telephone network (PSTN), a cable television network, a satellite network, a collection of networks, a public Internet Protocol (IP) network, a private IP network, or a combination thereof. Moreover, the network 108 may be wired, wireless, or a combination of the two.

The database management server 102 may include one or more network interfaces to communicate with one or more client devices via the network 108, such as the client devices 110-114. Further, the database management server 102 may be directly coupled to a number of client devices, such as a client device 116. The client devices 110-116 may each include a personal computer, a laptop computer, a personal digital assistant (PDA), a portable gaming device, a wireless communication device, such as a smart phone or mobile handset, a set-top-box, a game console, a portable music player, etc., or any combination thereof. The client devices 110-116 may include one or more processing units to execute applications that send requests to the database management server 102 to update, store, delete and retrieve data from the database 106.

The database management system 104 includes an index maintenance module 118. The index maintenance module 118 may include software instructions executable by a processor of the database management server 102 to maintain indexes of the database 106. Further, the index maintenance module 118 may include software, hardware, or a combination thereof.

The database management system 104 also includes one or more index maintenance groups 120. The index maintenance group 120 controls maintenance of one or more indexes and may include a number of components, such as a delta table, and one or more index control tables (also referred to herein as control tables). The delta table of the index maintenance group 120 records changes to rows of a base table of the database 106 based on updates to data of the database 106. The indexes contain specified columns of the database. An index may be viewed as being partitioned into sub-indexes for maintenance purposes. The index control tables indicate the maintenance status of the indexes and/or sub-indexes covered by the maintenance group. For example, an index control table indicates the last time that an index and/or sub-index was updated. The index maintenance module 118 may utilize components of the index maintenance group 120 to update indexes and sub-indexes of the database 106. At least some of the components of the index maintenance group 120 may be generated by the index maintenance module 118. In addition, components of the index maintenance group 120 may be generated by other software modules of the database management system 104.

In an illustrative implementation, a first client device 110 sends a request 122 to the database management server 102 to modify particular data of the database 106. For example, the request 122 may include a request to update, delete, or insert a row at a base table of the database 106. In response to receiving the request 122, the index maintenance module 118 may determine whether one or more indexes associated with the affected table are asynchronous or not. Non-asynchronous indexes are updated as part of the execution of the request 122, while maintenance of asynchronous indexes may be delayed until index maintenance is triggered. Events that may trigger index maintenance include receipt of a query at the database management server 102, where the query uses an asynchronous index. In addition, an index maintenance event may be triggered when the database management server 102 has free resources. Further, index maintenance may be requested explicitly by one of the client devices 110-116.

In another illustrative implementation, a second client device 114 sends a query 124 to the database management server 102. The query 124 may be included in a query statement or included as a component of another statement, such as a delete statement, an insert statement, or an update statement. In response to receiving the query 124, the index maintenance module 118 may determine whether an asynchronous index will be utilized when executing the query 124. When one or more asynchronous indexes are utilized in executing the query 124, the index maintenance module 118 may determine that index maintenance is required and may perform on-demand maintenance of the corresponding indexes and/or sub-indexes. Otherwise, the query 124 is executed without performing index maintenance.

The index maintenance module 118 may update the corresponding indexes accessed by the query 124 by first identifying any committed transactions that have previously modified rows that will be utilized by query 124. Committed transactions are transactions producing changes that have been made permanent. The committed transactions may be identified via the delta table of the index maintenance group 120. In one example, the index maintenance module 118 may update an index to reflect a change in a residential address requested by the query 124, where the residential address had been changed previously in a base table, but the index had not been updated to indicate the change. Once the indexes needed to execute the query 124 are current, the index maintenance module 118 may continue to update the indexes to incorporate any changes caused by earlier statements within the same transaction as that of the query 124. For example, a row of a base table of the database 106 may be inserted, deleted, or updated during execution of an earlier statement in the same transaction as the query 124 and the index maintenance module 118 may update any affected indexes based on the changes to the base table. After executing the statements of a transaction, the database management system 104 may commit the transaction. By committing the transaction, any changes to a base table of the database 106 that occurred during execution of the transaction are made permanent.

Different transactions may execute at different isolation levels. A transaction's isolation level determines which changes made by other concurrently executing transactions become visible. The index maintenance module 118 may perform index maintenance based on an isolation level of a particular transaction. For example, the database management system 104 may acquire locks on a delta table and/or a control table of the index maintenance group 120 during index maintenance based on the isolation level of a transaction. Acquiring a lock on particular data prevents modification of the data from additional writes of other statements.

Delaying index and sub-index maintenance until the occurrence of an index maintenance event, may more efficiently utilize resources of the database management server 102 than maintenance of non-asynchronous indexes because the inputs/outputs needed to perform index maintenance may be reduced. Further, users of the client devices 110-116 are unaware that index maintenance is needed before executing a query and index maintenance is performed on-demand in response to receiving the query statement.

Figure 2:
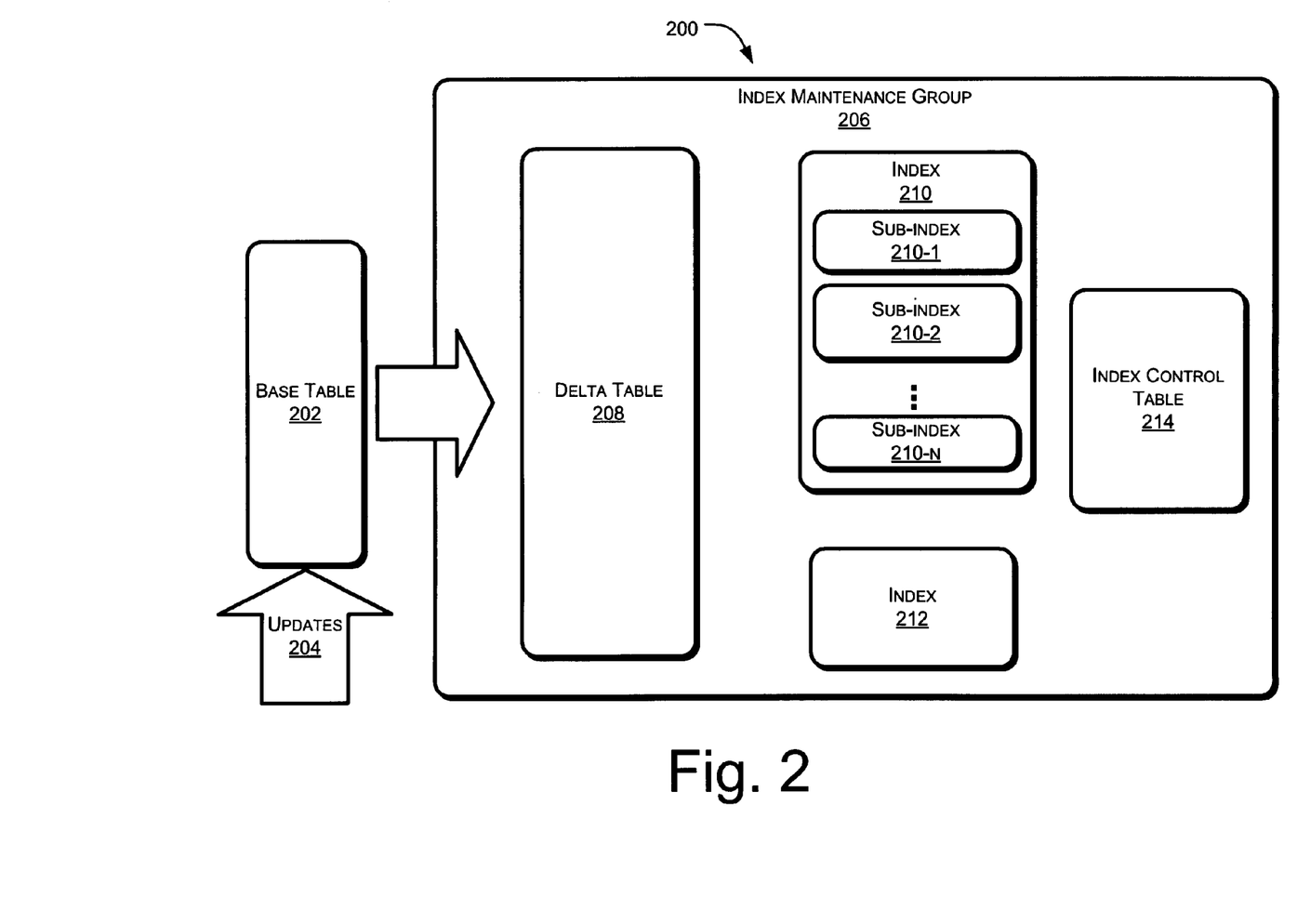
FIG. 2 illustrates a diagram of an embodiment of a framework of an index maintenance group to asynchronously maintain database indexes.

FIG. 2 illustrates a diagram of an embodiment of a framework 200 including an index maintenance group used for maintaining asynchronous indexes. The framework 200 may be utilized by the database management server 102 of FIG. 1 to perform maintenance of indexes and sub-indexes. The framework 200 includes a base table 202. The base table 202 may include a specified number of columns and a number of rows to organize data stored in a database, such as the database 106 of FIG. 1. The base table 202 may receive updates 204 based on statements to insert a row at the base table 202, delete a row at the base table 202, update data of a row of the base table 202, or a combination thereof.

The framework 200 also includes an index maintenance group 206. The index maintenance group 206 may be the index maintenance group 120 of FIG. 1. In addition, although only one index maintenance group is shown in FIG. 2, any number of index maintenance groups may be formed for the base table 202.

The index maintenance group 206 may be utilized by a database management system to maintain a number of indexes associated with the base table 202. The index maintenance group 206 includes a delta table 208. The delta table 208 records changes made to the base table 202 by the updates 204. Execution of the updates 204 may add one or more rows to the delta table 208. For example, execution of an insert statement or a delete statement may add a row to the delta table 208 indicating changes to the base table 202 caused by the insert statement or the delete statement. In another example, execution of an update statement may add two rows to the delta table 208. One of the rows indicates a delete action with respect to the previous values of the base table row, while the second row indicates an insert action indicating the updated values of the base table row. The delta table 208 may be clustered or non-clustered. When the delta table 208 is clustered, the rows of the delta table 208 may be sorted according to values of one or more columns of the delta table 208. When the delta table 208 is non-clustered, the rows of the delta table 208 are not sorted according to values of particular columns of the delta table 208.

The index maintenance group 206 also includes a number of indexes, such as a first index 210 and a second index 212. The indexes 210, 212 may be created using one or more columns of the base table 202. For example, a base table 202 storing first name, last name, phone number, street number, and zip code of residents of a particular city may be indexed according to last name and according to zip code. Thus, the first index 210 may include the values of the last name column of the base table 202 and the second index 212 may include the values of the zip code column of the base table 202. The indexes 210, 212 may be stored clustered on values of on one or more of their columns. The indexes 210, 212 may also be filtered where only a portion of the rows of the base table 202 are included in a particular index based on the values of the rows satisfying a specified condition. Continuing with the above example, the first index 210 may be filtered to include residents having last names starting with the letter "S".

An index may, for maintenance purposes, be viewed as being divided into sub-indexes, such as the sub-indexes 210-1-210-$n$ of the first index 210. The sub-indexes are comprised of groups of adjacent rows of an index. The division into sub-indexes is typically specified by one or more columns that form a prefix of the clustering (sort) key of the index. For example, an index on people's names that is clustered on columns last name and first name could be viewed as divided into sub-indexes based on the column last name. This means that all rows with the same last name are treated as a sub-index. This allows targeted maintenance, which reduces maintenance overhead. For example, if a query needs only rows with last name equal to Smith, only that part of the index needs to be maintained, that is, the sub-index comprised of the Smith rows.

In addition, the index maintenance group 206 includes one or more index control tables, such as an index control table 214. The index control table 214 includes one row per materialized sub-index. Sub-indexes that are not materialized are not represented in the control table 214. The index control table 214 indicates the maintenance status of the indexes and sub-indexes of the index maintenance group 206.

Figure 3:
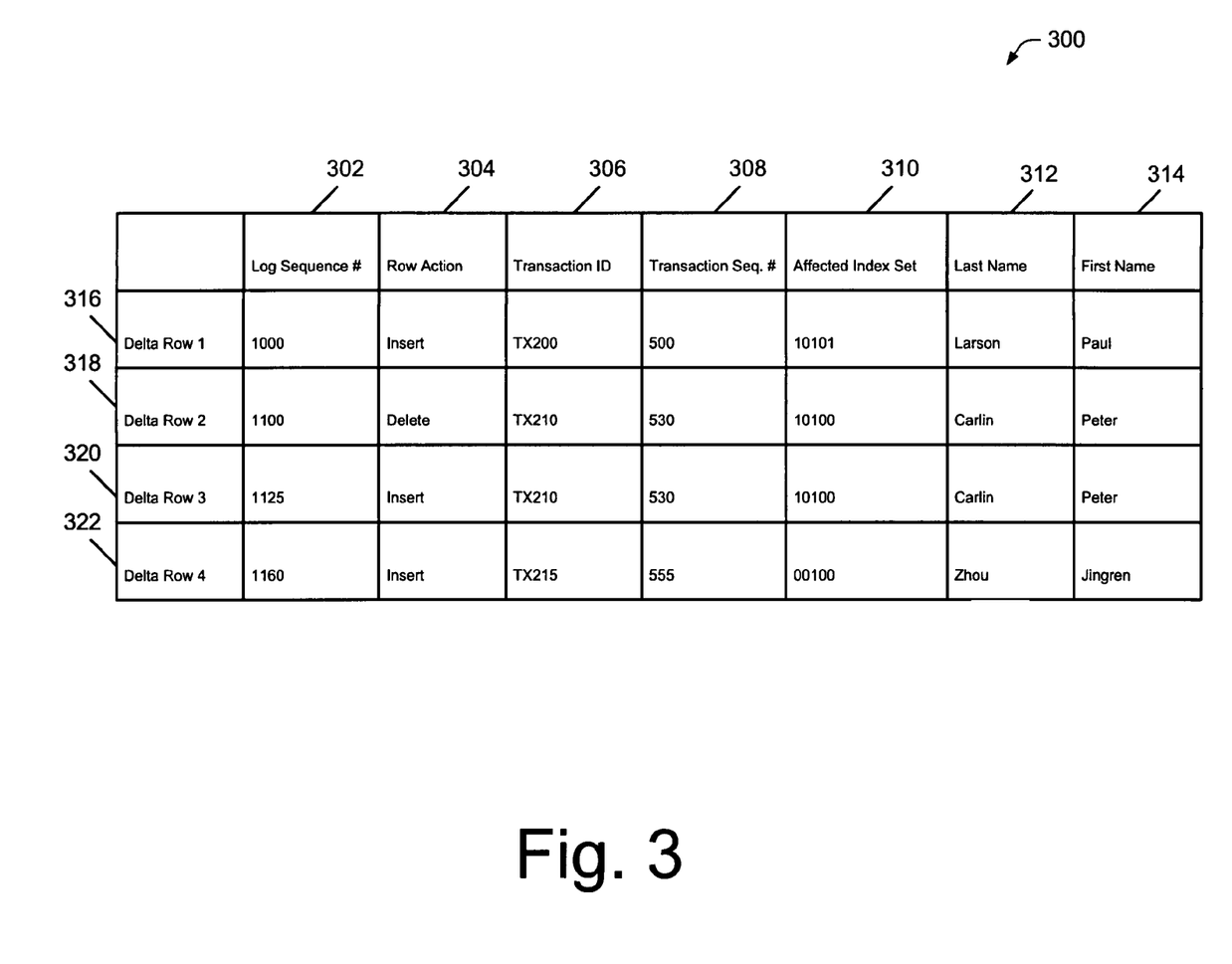
FIG. 3 illustrates an embodiment of a delta table of an index maintenance group to asynchronously maintain database indexes.

FIG. 3 illustrates an embodiment of a delta table 300 of an index maintenance group, such as the index maintenance group 206 of FIG. 2. The delta table 300 indicates changes made to a base table, such as the base table 202 of FIG. 2. The delta table 300 includes a number of columns 302-314 and a number of rows 316-322. Although four rows (Delta Row 1-Delta Row 4) are shown in FIG. 3, the delta table 300 may include any number of rows. In addition, the specific values provided for each entry of delta table 300 are for illustrative purposes and do not limit the values and formats for the entries of the delta table 300. The delta table 300 includes at least one row for each row of a delta stream produced by changes to a base table.

The first column 302 (Log Sequence Number) specifies the log sequence number of each of the rows 314-320. A log sequence number is a unique number assigned by a database management system to log entries that occur in response to execution of a transaction. A log entry is entered for each row that is inserted, updated or deleted by a transaction. The second column 304 (Row Action) indicates a row action, which is one of insert or delete. The third column 306 (Transaction Identification Number) indicates a transaction identification number. A transaction identification number is normally assigned to each transaction executed by a database management system. More than one row may have the same transaction identification number, but each row will have a different log sequence number.

The fourth column 308 (Transaction Sequence Number) specifies transaction sequence numbers for each row 314-320. A transaction sequence number is a unique sequence number assigned to a transaction when the transaction begins executing. The transaction sequence number column is not used unless the database is enabled for snapshot isolation. The fifth column 310 (Affected Index Set) contains a bitmap that includes one bit for each index in an index maintenance group. A particular bit of the bitmap is set to one if the row affects the index associated with the particular bit. For example, an index maintenance group may include five indexes and the Affected Index Set column would then include five bits. If the changes made with respect to the row 314 (Delta Row 1) affect indexes 1, 3, and 5 of the index maintenance group, the first, third, and fifth bits would be set to 1 and the second and fourth bits would be set to 0. In addition, the delta table includes every column contained in any index of the index maintenance group. The sixth column 312 (Last Name) and seventh column 314 (First Name) are the only columns included in an index covered by this index maintenance group.

Delta tables may be clustered on log sequence number (i.e. the first column 302) or on log sequence number and any set of index columns, that is, the sixth and higher columns. Delta tables may be constructed from delta streams that are produced when a base table is modified by an insert, update or delete statement. The delta streams may include data, such as a log sequence number, a row action, and columns included in indexes affected by the modifications. The rows of the delta streams may be used to populate rows of a delta table of an index maintenance group. To illustrate, a row of the delta table 300 may be constructed by copying a log sequence number, row action, and affected columns from a delta stream. Further, a row of the delta table 300 may be constructed by copying the transaction identification number and transaction sequence number (when applicable) of the transaction producing the delta stream. Determining which bits in the fifth column 310 to set can be done in several ways. The simplest method is to set all bits for a row that was generated by an insert or a delete statement. Update statements generate two rows for each modified row: one delete row containing the old values and one insert row with the new value. The bit for an index is then set if the values of any of the columns contained in the index differ in the two rows. If the old and new values are the same for all columns included in the index, nothing would change in the index so the two rows can be ignored.

In an illustrative implementation, the number of rows added to the delta table 300 may be reduced when an index is filtered and when an index includes sub-indexes that are not materialized. For example, if a delta stream affects a filtered index, but the values of a base table row associated with the delta stream do not satisfy the filtering criteria, then a row does not need to be added to the delta table 300 for that delta stream. Further, if a sub-index affected by a change to a base table is not located in the control table, that is, the sub-index is no longer maintained or is not materialized, then a row does not need to be added to the delta table 300 for that delta stream.

Figure 4:
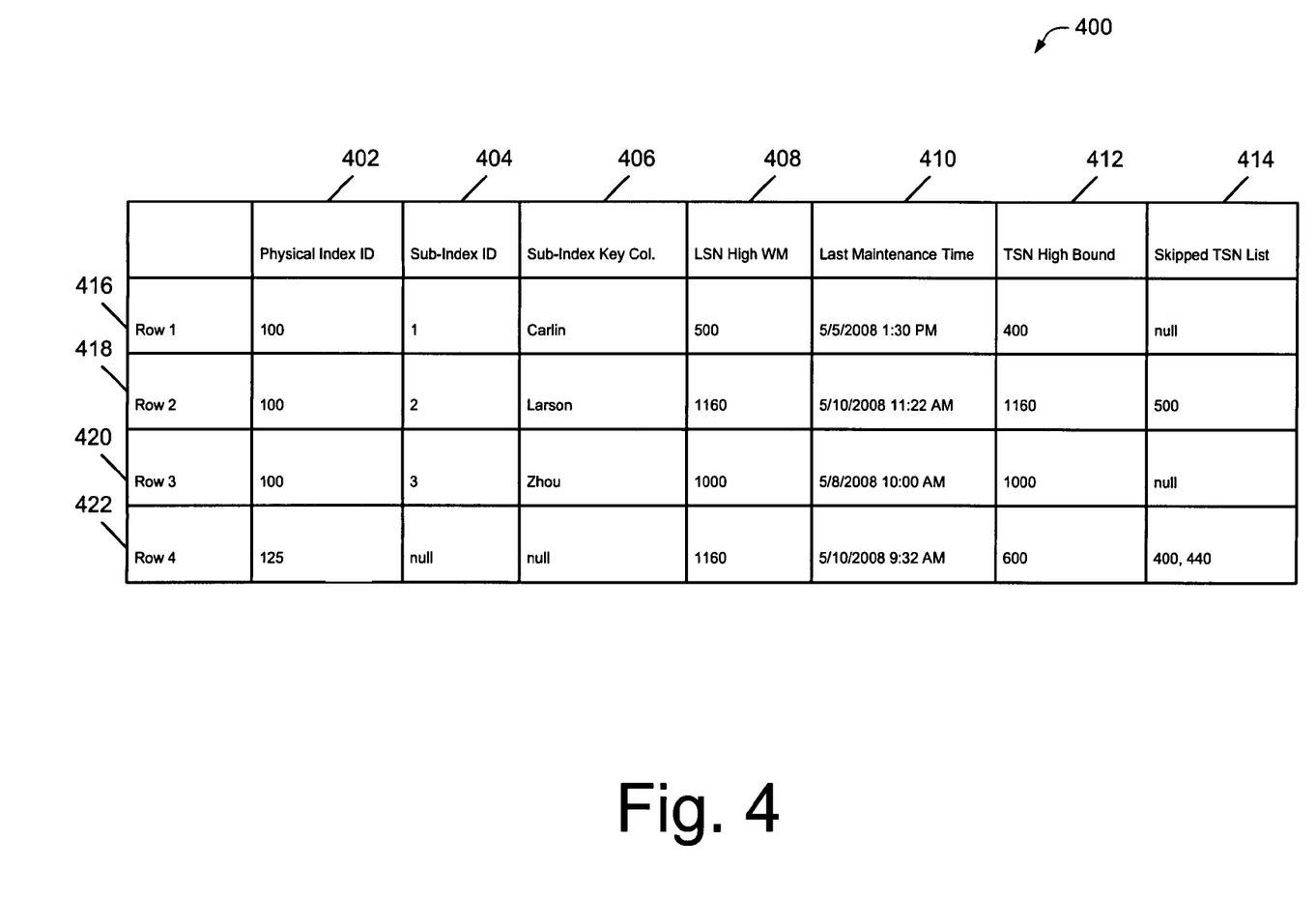
FIG. 4 illustrates an embodiment of an index control table of an index maintenance group to asynchronously maintain database indexes.

An example of an algorithm to construct delta table rows may include:
1. Set ColSet=Ø, IndexSet=Ø
2. For each index I in the maintenance group
 2.1. FilterSatisfied=true, TargetSubidxActive=true
 2.2. If index I is filtered, evaluate the filter predicate and set FilterSatisfied accordingly (optional)
 2.3. If FilterSatisfied is true and index I is subindexed, lookup the subindex in the control table using the PhysicalId of index I and the subindex key value from the input delta row (optional)
 2.4. If the target subindex is not found in the control table or it is not maintained any longer, set TargetSubidxActive=false (optional)
 2.5. If Filtersatisfied and TargetSubidxActive are both true, do the following
  2.5.1. Add PhysicalId of Index I to IndexSet;
  2.5.2. Add all columns included in index I to ColSet
3. If IndexSet≠Ø, create an output row and set it columns values as follows
 3.1. Copy LSN and RowAction from the input delta row
 3.2. Set TransactionId to the Id of the current transaction
 3.3. If snapshot isolation is enabled on the database, set TSN to the transaction sequence number of the current transaction
 3.4. For each index in IndexSet, set the corresponding bit in AffectedIndexSet
 3.5. Copy all the value of all columns in ColSet from the input delta row FIG. 4 illustrates an embodiment of an index control table 400 of an index maintenance group. The index control table 400 may be the index control table 204 of FIG. 2. The control table 400 includes a number of columns 402-414. In addition, the control table 400 includes a number of rows 416-422. Each row of the control table 400 corresponds to a materialized sub-index of an index maintenance group. Although four rows (Row 1-Row 4) are shown in the control table 400, any number of rows may be included in the control table 400. In addition, the specific values provided for each entry of control table 400 are for illustrative purposes and do not limit the values and formats for the entries of the control table 400.

The first column 402 (Physical Index Identification Number) indicates the identification number for the physical index associated with a row. In addition, the second column 404 (Sub-Index Identification Number) includes a sub-index identification number for the sub-index associated with a row. The third column 406 (Sub-Index Key Columns) represents a set of columns, namely, every column used to specify sub-indexing of indexes in the index maintenance group. In our example, this set includes only the last name column. The fourth column 408 (Log Sequence Number High Watermark) indicates the log sequence number of the last row of the delta table that has been checked during maintenance of the sub-index. Additionally, the fifth column 410 (Last Maintenance Time) specifies the time of the last maintenance for the sub-index.

For databases enabled for snapshot isolation, the sixth column 412 (Transaction Sequence Number High Bound) and the seventh column 414 (Skipped Transaction Sequence Number List) are added to the control table 400. The sixth column 412 indicates that all transactions with a transaction sequence number less than this value have been applied to the sub-index, except those transactions listed in the seventh column 414. The seventh column 414 contains a list of transactions whose rows in the delta table have not been applied to the sub-index. The changes from these transactions were not applied to the sub-index because at the time of the last maintenance operation, these transactions were still active and not committed.

In some embodiments, the control table may be clustered on the first column 402 and the third column 406. Further, columns may need to be added to index metadata. For example, a column (SubIndexKeyPrefix) may be added to index metadata indicating the number of columns of a physical index clustering key that serve as a sub-indexing key. The sub-indexing key may be a prefix of the index clustering key.

Figure 5:
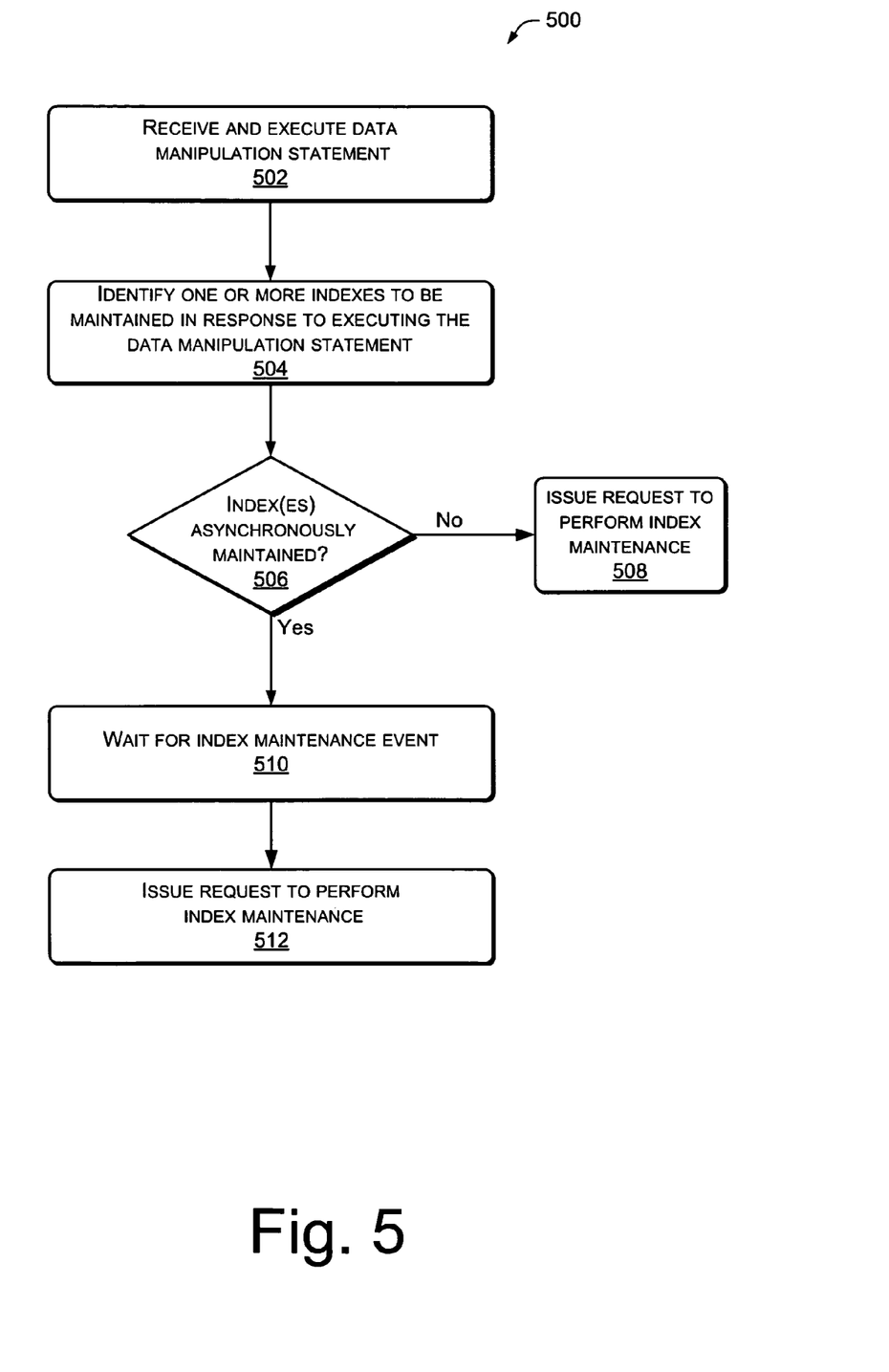
FIG. 5 illustrates a flow diagram of a method to maintain database indexes after receiving a data manipulation statement.

FIG. 5 illustrates a flow diagram of a method 500 to maintain database indexes after receiving a data manipulation statement. The method 500 may be executed by a database management server, such as the database management server 102 of FIG. 1.

At 502, a database management server receives a data manipulation statement, such as an insert statement, a delete statement, or an update statement. When executed, the data manipulation statement modifies one or more rows of a database base table. At 504, one or more indexes are identified that need to be maintained in response to executing the data manipulation statement. To illustrate, when a row of a database base table has been modified by a data manipulation statement, an index associated with the base table may also need to be modified to reflect the change in the base table. In this way, the index will be up to date for queries utilizing the index.

At 506, the database management server determines, for each affected index, whether the index is maintained synchronously or asynchronously. When an index is to be maintained synchronously, the method proceeds to 508 where a request to perform index maintenance is issued to maintain the corresponding index. When an index is to be maintained asynchronously, maintenance of the index is delayed and the method moves to 510. In some implementations, a number of indexes to be maintained in response to executing the data manipulation statement may be maintained asynchronously, while a number of other indexes are to be maintained synchronously.

At 510, the database management server delays maintenance of an index until an index maintenance event occurs. For example, the index maintenance event may occur upon receipt of a query utilizing an index that is to be maintained asynchronously. The index maintenance event may also occur when the database management server has free resources. Further, the index maintenance event may occur upon receiving an explicit request from a client device to perform index maintenance. When an index maintenance event does occur, the method proceeds to 512. At 512, a request is issued to perform index maintenance on the indexes that are to be asynchronously maintained. Index maintenance is then subsequently performed on these indexes.

Figure 6:
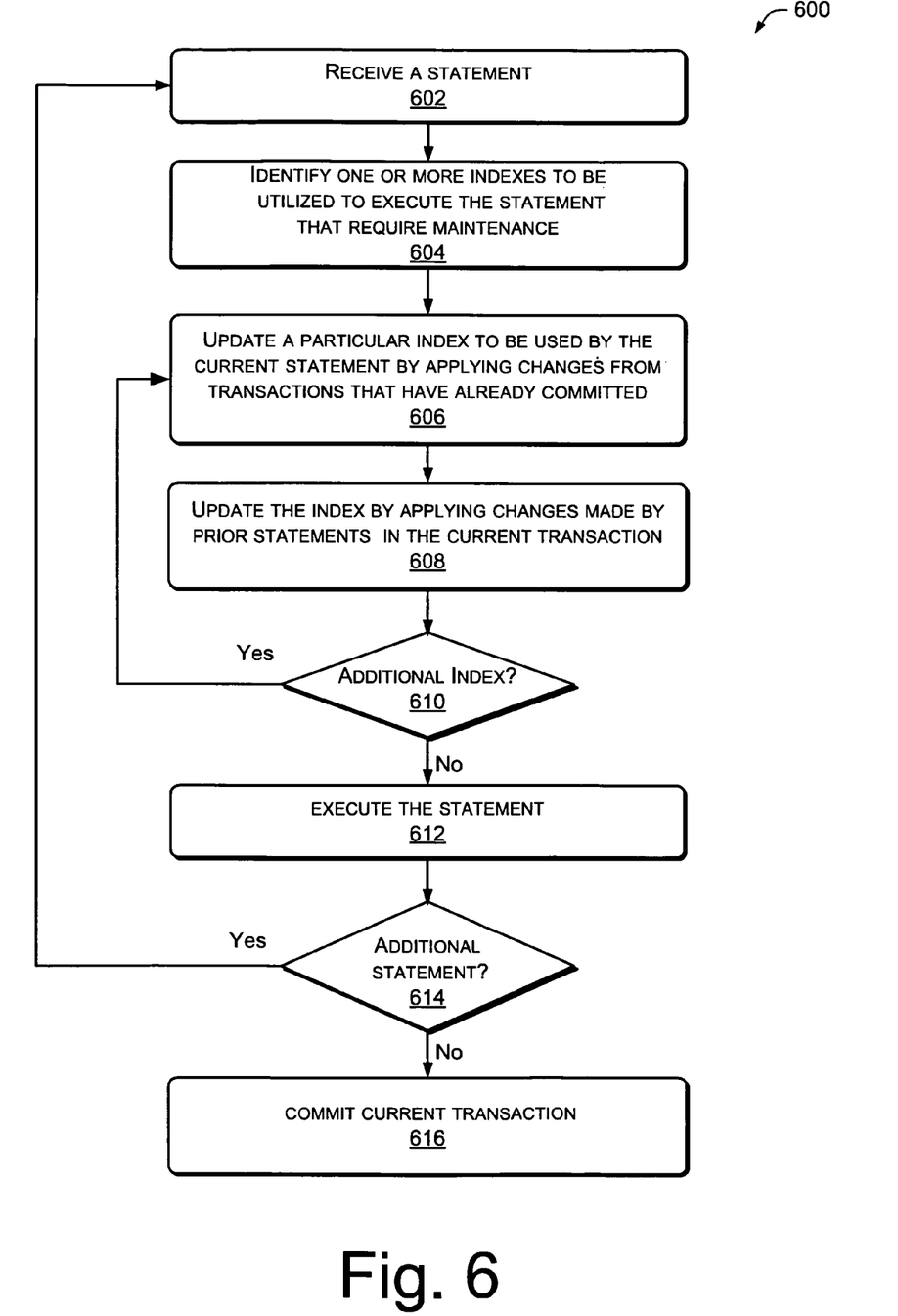
FIG. 6 illustrates a flow diagram of a method to maintain database indexes in response to receiving a statement.

FIG. 6 illustrates a flow diagram of a method 600 to maintain database indexes in response to receiving a query or data manipulation (insert, delete, or update) statement including a query component. The method 600 may be executed by a database management server, such as the database management server 102 of FIG. 1. At 602, a statement is received at a database management server coupled to a database. The statement may be one of a number of statements included in a particular transaction. Receiving the statement is an event that triggers maintenance of indexes that are used during execution of the statement and that are maintained asynchronously.

Figure 7:
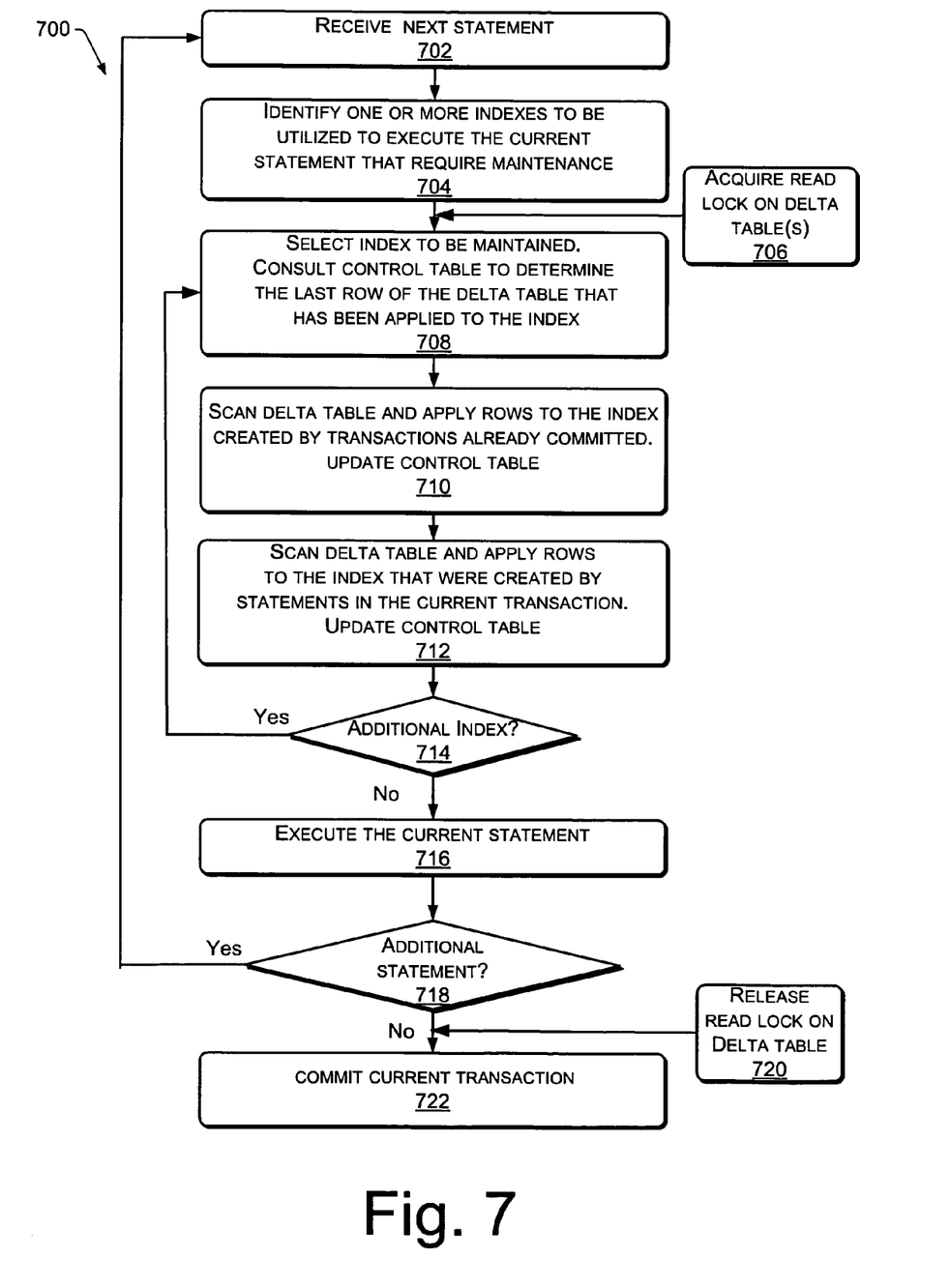
FIG. 7 illustrates a flow diagram of a method to maintain database indexes according to a serializable isolation level and a repeatable read isolation level.
Figure 8:
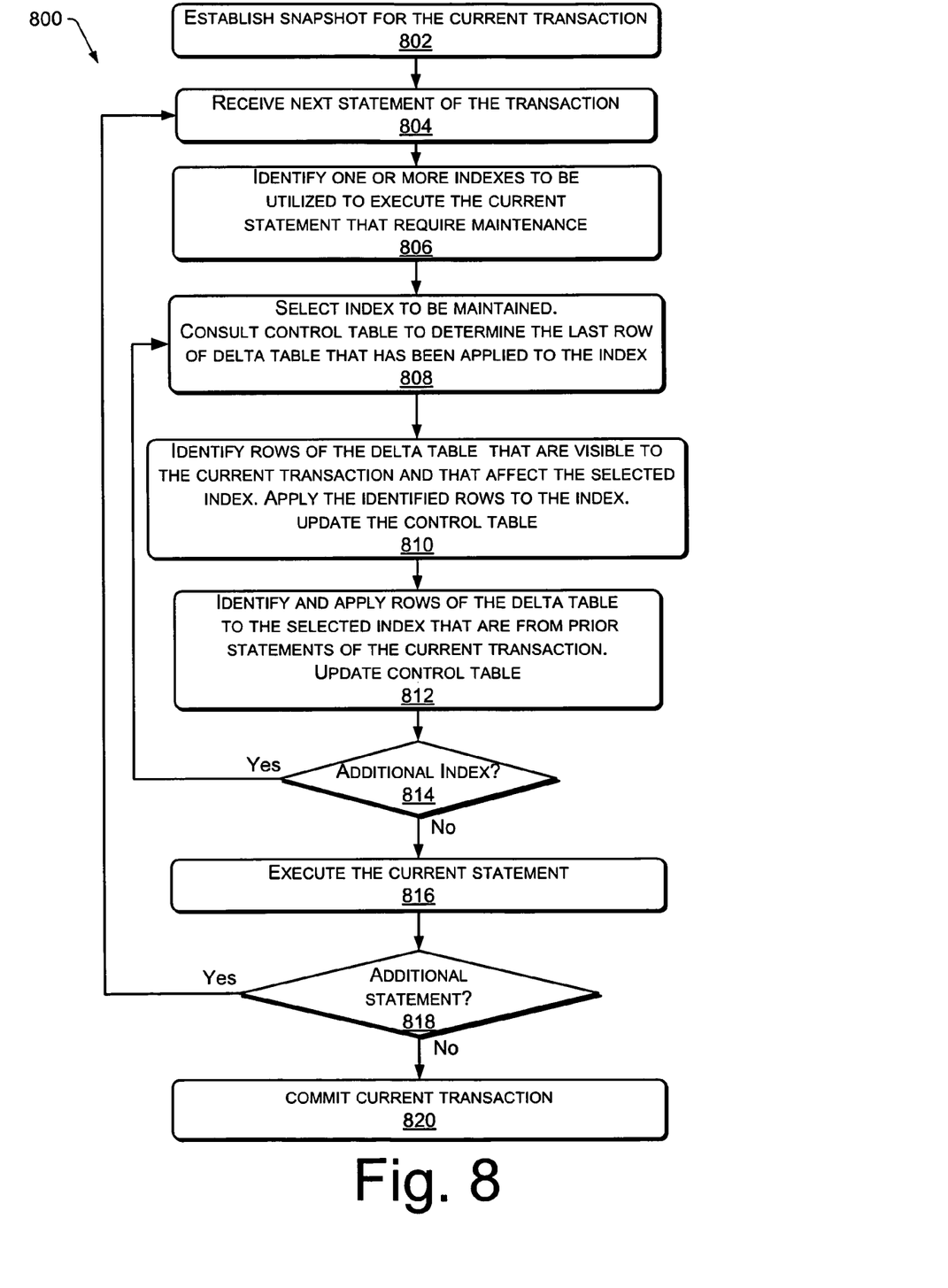
FIG. 8 illustrates a flow diagram of a method to maintain database indexes according to a snapshot isolation level.

At 604, the database management server identifies one or more indexes to be utilized to execute the current statement that require index maintenance. At 606, a particular index is maintained by applying changes made by other transactions that have already committed. In this way, the index is updated to reflect changes made to the base table by statements of committed transactions that had not yet been manifested in the index. The particular index is updated based on an isolation level associated with the current transaction. For example, rows of a delta table applied to update the particular index may be based on the isolation level of the transaction. The current transaction may be associated with a serializable read isolation level, a repeatable read isolation level, a read committed isolation level, a read uncommitted isolation level, a snapshot isolation level, or a read committed snapshot isolation level. FIGS. 7 and 8 provide methods to update indexes according to different isolation levels.

At 608, the particular index is maintained by applying changes made by earlier statements of the current transaction that have not yet been manifested in the index. For example, one or more data manipulation statements may have been executed in the current transaction that modified a base table, but the changes to the base table have not been applied to the index. When the current statement is received, the database management server updates the index based on the changes made by these previously executed statements of the current transaction.

At 610, the database management server determines whether an additional index utilized by the current statement needs to be updated. When an additional index does need to be updated, the method 600 returns to 606. When an additional index does not need to be updated, the method proceeds to 612 where the current statement is executed. At 614, the database management server determines whether an additional statement that needs to be executed has been received that is included in the current transaction. When the current transaction includes an additional statement, the method returns to 602. When the current transaction does not include an additional query or data manipulation statement that needs to be executed, the current transaction is committed.

In some embodiments, maintenance may take place with respect to one or more sub-indexes within a particular index. For example, upon receiving a statement of a current transaction, the database management server may identify one or more indexes that are utilized to execute the query statement that require maintenance and then identify one or more sub-indexes within these indexes that require maintenance. The database management server may then maintain each sub-index of a particular index before moving on to maintain sub-indexes of any additional indexes requiring maintenance.

FIG. 7 illustrates a flow diagram of a method 700 to maintain database indexes according to a serializable isolation level and a repeatable read isolation level. The method 700 may be executed by a database management server, such as the database management server 102 of FIG. 1.

In a serializable isolation level a transaction is completely isolated from changes made by other concurrent transactions. Thus, under the serializable isolation level, it is as if transactions were executed serially, one after the other. That is, a transaction will see either all or none of the changes made by another transaction. In a repeatable read isolation level, a transaction may see new rows that were inserted by other transactions that committed while the transaction was active.

The method 700 begins at 702 with receiving the next statement of a transaction, such as a query. Receipt of the statement is an event triggering maintenance of indexes utilized during execution of the statement. The statement may be one of a number of statements of a current transaction. At 704, the database management server identifies one or more indexes or sub-indexes that require maintenance because they are to be utilized to evaluate the statement.

At 706, a read lock is acquired on all delta tables associated with an index or sub-index to be maintained. The read lock on a delta table blocks updates of the delta table and also ensures that no rows of the delta table added by uncommitted transaction will be utilized during index maintenance. In some implementations, the read lock on the delta table is a read range lock where only a target portion of the delta table is locked. In other implementations, such as when the delta table is clustered only on log sequence numbers, a table lock is acquired on the delta table.

At 708, one of the indexes or sub-indexes identified in step 704 is selected for maintenance. The corresponding row in the control table is retrieved to identify the last row of the delta table that has been applied to the selected index or sub-index. The control table row is read locked, which forces the database management server to wait for any ongoing maintenance of the selected index or sub-index to complete before proceeding. The database management server then retrieves the value of the log sequence number high watermark (LSN High Watermark).

At 710, the database management server scans the delta table forward from the position indicated by LSN High Watermark and applies rows of the delta table to the selected index or sub-index, where the rows of the delta table are from transactions already committed. In an illustrative implementation, the database management server performs step 710 in a separate system transaction. Therefore, even if the current transaction is rolled back, the index maintenance performed by the system transaction will not be rolled back, but completed.

During the system transaction, a write lock is acquired on the control table row associated with the selected index or sub-index and LSN High Water Mark is retrieved again. In response to acquiring the write lock on the control table row, the database management server waits for any ongoing maintenance operations associated with the particular index or sub-index to complete before proceeding. The database management server then scans the target portion of the delta table from LSN High Watermark to the end of the delta table (i.e. the row of the delta table added most recently). The database management server skips rows of the delta table with a prefix key value that does not match the prefix key value of the particular index or sub-index. The database management server may also skip rows of the delta table that do not have the bit for the physical index including the particular index or sub-index set to 1 in the Affected Index Set column. Other rows of the delta table, when the transaction identification number of the row is not the transaction identification number of the current transaction, form a delta stream that is then condensed and applied to the selected index or sub-index. The control table is updated by setting the LSN High Watermark value of the row associated with the sub-index to the LSN of the last delta table row read. The system transaction is then committed and the write lock on the control table row is released.

At 712, the database management server identifies and applies delta table rows generated by statements of the current transaction. This part of maintenance is preformed as part of the current transaction so, if the current transaction is rolled back, the changes made to the index or sub-index maintenance in 712 will also be rolled back.

The delta table rows generated by prior statements of the current transaction are identified by scanning the target portion of the delta table from the value of LSN High Watermark until the end of the delta table. The database management server skips the rows of the delta table with a prefix key value that does not match the prefix key value of the selected index or sub-index. The database management server may also skip rows of the delta table that do not have the bit for the physical index including the selected index or sub-index set to 1 in the Affected Index Set column. Other rows of the delta table, if the transaction identification number of the row is the same as the transaction identification number of the current transaction, form a delta stream that is then condensed and applied to the selected index or sub-index. Further, the control table is updated by setting the LSN High Watermark value of the row associated with the index/sub-index to the LSN of the last delta table row read.

At 714, the database management server determines whether an additional index utilized by the current statement needs to be maintained. When an additional index does need to be maintained, the method 700 returns to 708. Otherwise, the method proceeds to 716 where the current statement is executed. At 718, the database management server determines whether the current transaction includes an additional statement that needs to be executed. When the current transaction does include an additional statement to be executed, the method 700 returns to 702. Otherwise, the method 700 moves to 720. At 720, the read lock on the delta table is released. At 722, the current transaction is committed.

An alternative to the method 700 may be applied to statements of transactions having a read committed isolation level, which allows a statement to see any changes made by other transactions that have committed. In particular, the read lock on the delta table may be released after each statement is executed rather than after all statements have executed. Further, this alternative approach to the method 700 may also be applied to statements included in transactions having a read uncommitted isolation level. Under a read uncommitted isolation level, a transaction may see changes to the particular index or sub-index made by other uncommitted transactions. However, since some changes associated with uncommitted transactions may be rolled back and because tracking whether uncommitted transactions have been correctly rolled back is difficult, it may be advantageous to apply only changes associated with committed transactions to a particular index or sub-index, as in the approach applied to statements under the read committed isolation level.

Several additional alternative index/sub-index maintenance approaches may be implemented instead of the approaches of the method 700. In one alternative approach, read locks are not obtained on the delta table, but instead all uncommitted rows of the delta table are ignored during maintenance of indexes and sub-indexes. A log sequence number high watermark, a log sequence number low watermark, and a list of skipped transactions may be used to identify rows of the delta table that have been applied to a particular index or sub-index. The delta table rows before the log sequence number low watermark have been applied to a particular index or sub-index, the delta table rows after the log sequence number high watermark have not been applied to the particular index or sub-index, and in between the low watermark and high watermark, the transactions have been applied, except for those specified in the list of skipped transactions.

In another alternative approach, the same delta table row may be applied to an index or sub-index multiple times without changing the result. Thus, a list of skipped transactions can be eliminated, but the log sequence number low watermark can be utilized. Maintenance of indexes and sub-indexes starts from the low watermark and the application of certain rows of the delta table multiple times does not affect the result of the transaction.

In a further alternative approach, delta table rows are written to a staging table before actually being inserted into the delta table. The rows from the staging table are written to the delta table after being committed. Thus, the delta table will include only changes originating from committed transactions.

FIG. 8 illustrates a flow diagram of a method 800 to maintain database indexes according to a snapshot isolation level. The method 800 may be executed by a database management server, such as the database management server 102 of FIG. 1.

When snapshot isolation is enabled, each transaction obtains a transaction sequence number at the beginning of execution of a first statement of the transaction. In addition, each transaction is assigned a commit sequence number when the transaction commits. A particular transaction sees all changes made by transactions with a commit sequence number less than the transaction sequence number of particular transaction, that is, all transactions that committed before the statements of the particular transaction began executing. Row versions created when a table row is modified are labeled with the transaction sequence number of the transaction producing the version. In the embodiment described herein, with respect to transactions executed under a snapshot isolation level, the base table, the index, and the delta table are versioned, but the control table is not. That is, the database management server creates a version of a delta table row, base table row, index row, or a combination thereof, each time the particular row is modified to reflect the changes to the row.

The method begins at 802 with establishing a snapshot for the current transaction. The snapshot includes the transaction sequence number (TSN) of the transaction and the transaction sequence number of all active transactions (Active TSN List). The snapshot is utilized by the database management server to determine a particular version of a row to return to the current transaction. The version returned to the transaction has the TSN that is less than the TSN of the transaction and its TSN is not included in the Active TSN List.

At 804, the database management server receives the next statement of the transaction. Receipt of the statement is an event triggering maintenance of indexes to be utilized during execution of the statement. At 806, the database management server identifies one or more indexes or sub-indexes that are to be utilized to evaluate the statement that require maintenance.

At 808, an index or sub-index to be maintained is selected and the corresponding row in the control table is consulted to identify a last row of the delta table applied to a selected index or sub-index. A read lock is first acquired on the row of the control table row. Consequently, the database management server waits for any ongoing maintenance with respect to the particular index or sub-index to complete before proceeding. The database management server then reads the control table row and retrieves the value of the log sequence number high watermark (LSN High Watermark), the value of transaction sequence number high bound (TSN High Bound), and the Skipped TSN List. A variable TSN Completed is calculated by subtracting the Active TSN List for the current transaction from the Skipped TSN List of the control table row. Thus, the TSN Completed variable gives the transactions that were still active during the last maintenance of the particular index or sub-index, but are now completed. A local value of the log sequence number high watermark (LSN Local High Watermark) is then set to LSN High Watermark and the read lock is released on the control table row.

At 810, the database management server identifies and applies one or more rows of the delta table to the selected index or sub-index, where the rows of the delta table are from other transactions and that are visible, under snapshot isolation, to the current transaction. Additionally, at 810, the control table is updated.

In an illustrative implementation, the database management server executes step 810 in a serializable system transaction The serializable system transaction utilizes the same snapshot as the current transaction to ensure that it sees exactly the same row versions as the current transaction. The serializable system transaction, acquires a write lock on the control table row associated with the selected index or sub-index and retrieves and LSN High Water Mark, TSN High Bound, and Skipped TSN List again from the control table row. In response to acquiring the write lock on the control table row, the database management server waits for any ongoing maintenance operations associated with the selected index or sub-index to complete before proceeding. Additionally, TSN Completed is computed by subtracting Active TSN List of the transaction from Skipped TSN List of the control table row for the particular index or sub-index.

The database management server then scans the target portion of the delta table from LSN High Watermark to the end of the delta table. The database management server skips the rows of the delta table with a prefix key value that does not match the prefix key value of the selected index or sub-index. The database management server may also skip rows of the delta table that do not have the bit for the particular index set to 1 in the Affected Index Set column. Further, the database management server may skip delta table rows because the delta table rows are not visible to the current transaction. The first delta table row skipped is recorded in a variable LSN First Skipped. Remaining delta table rows with a transaction sequence number greater than TSN High Bound or with a transaction sequence number in Skipped TSN List, form a delta stream that is then condensed and applied to the selected index or sub-index. When the condensed delta streams are applied to the selected index or sub-index, new versions of the delta table rows are created. These new versions of the delta table rows inherit the version number from the corresponding delta table row. The control table is updated by setting the LSN High Watermark value of the row associated with the sub-index to the value of LSN First Skipped, setting TSN High Bound to the transaction sequence number of the serializable system transaction, and setting the value of Skipped TSN List to the value of Active TSN List. The system transaction is then committed and the write lock on the control table is released.

At 812, the database management server identifies and applies delta table rows generated by statements of the current transaction that need to be applied to the particular index or sub-index. Since, applying delta rows generated by the current transaction is performed within the current transaction, if the current transaction is rolled back, any index maintenance that occurs at 812 will also be rolled back.

The delta table rows generated by the current transaction are identified by scanning the target portion of the delta table from the value of LSN Local High Watermark until the end of the delta table. The database management server skips the rows of the delta table with a prefix key value that does not match the prefix key value of the particular index or sub-index. The database management server may also skip rows of the delta table that do not have the bit for the index set to 1 in the Affected Index Set column. Additionally, the database management server skips delta table rows with a transaction sequence number that is not equal to the transaction sequence number of the current transaction. Rows of the delta table that are not skipped form a delta stream that is then condensed and applied to the selected index or sub-index. Further, LSN Local High Watermark is set to the log sequence number of the last row of the delta table read by the database management system.

At 814, the database management server determines whether an additional index or sub-index utilized by the current statement needs to be maintained. When an additional index does need to be maintained, the method 800 returns to 808. Otherwise, the method proceeds to 816 where the statement is executed. At 818, the database management server determines whether the current transaction includes an additional statement that needs to be executed. When the current transaction does include an additional statement that needs to be executed, the method 800 returns to 804. Otherwise, the method 800 moves to 820. At 820, the database management server commits the current transaction.

The method 800 may also be applied under a read committed snapshot isolation level with the exception that a snapshot is taken before executing each statement of the current transaction, rather than taking one snapshot at 802 for the entire transaction. Index maintenance under read committed snapshot isolation uses the snapshots taken for each statement.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
receiving a query or data manipulation statement at a database management server, wherein the database management server utilizes one or more indexes to execute the statement;
determining, at the database management server, whether an index that is asynchronously maintained is to be utilized during execution of the statement, the index comprising sub-indexes;
determining, at the database management server, whether maintenance of a sub-index of the index is needed when the index is to be utilized during execution of the statement; and
performing maintenance of the sub-index of the index, at the database management server, before executing the statement.

2. The method of claim 1, wherein determining whether maintenance of the sub-index is needed includes identifying, at the database management server, at least one row of a delta table that has not been applied to the index, wherein the delta table indicates changes to rows of the database base table.

3. The method of claim 2, wherein a control table associated with the index specifies a last row of the delta table that has been applied to the sub-index.

4. The method of claim 3, further comprising updating the control table, at the database management server, after performing maintenance of the sub-index to indicate a last row of the delta table that has been applied to the sub-index during the maintenance of the sub-index.

5. The method of claim 1, wherein the statement is a data manipulation statement, and wherein an additional index utilized to execute the statement is synchronously maintained.

6. The method of claim 1, further comprising performing maintenance of the sub-index, at the database management server, in response to determining that the database management server has free processing resources.

7. One or more computer-readable storage media including instructions that, when executed by a processing unit of a database management server, perform acts comprising:
receiving a current statement at the database management server, wherein the current statement is included in a transaction;
identifying an index to be utilized to execute the current statement that requires maintenance, wherein the index includes at least one column of a database base table;
identifying a particular row of a delta table that has not been applied to the index, wherein the delta table indicates changes to rows of the database base table;
determining whether the particular row of the delta table is to be applied during maintenance of the index based on an isolation level of the transaction; and
updating the index according to the particular row of the delta table before executing the current statement when the particular row is to be applied during index maintenance.

8. The one or more computer-readable storage media, as recited in claim 7, wherein the particular row of the delta table that has not been applied to the index is produced by a statement included in a committed transaction.

9. The one or more computer-readable storage media, as recited in claim 7, wherein the transaction includes a plurality of statements.

10. The one or more computer-readable storage media, as recited in claim 9, wherein a respective statement of the transaction adds an additional row to the delta table before receiving the current statement.

11. The one or more computer-readable storage media, as recited in claim 10, wherein updating the index before executing the current statement includes updating the index based on the additional row added to the delta table by the respective statement.

12. The one or more computer-readable storage media, as recited in claim 7, wherein the acts comprise:
determining whether an additional index is to be utilized to execute the current statement after updating the index;
executing the current statement when an additional index is not utilized to execute the current statement; and
updating the additional index before executing the current statement when the additional index is to be utilized to execute the current statement.

13. The one or more computer-readable storage media, as recited in claim 7, wherein the acts comprise:
executing the current statement;
determining whether the transaction includes an additional statement to be executed; and
identifying an additional index to be utilized to execute the additional statement that requires maintenance after determining that the transaction includes the additional statement.

14. The one or more computer-readable storage media, as recited in claim 13, wherein the isolation level of the transaction is a serializable isolation level or a repeatable read isolation level, and wherein the acts comprise releasing a read lock on the delta table after all statements of the transaction have been executed.

15. The one or more computer-readable storage media, as recited in claim 13, wherein the isolation level of the transaction is a read committed isolation level or a read uncommitted isolation level, and wherein the acts comprise releasing a read lock on the delta table in response to determining that the transaction includes the additional statement.

16. The one or more computer-readable storage media, as recited in claim 7, wherein the isolation level of the particular transaction is a snapshot isolation level, wherein the acts comprise establishing a snapshot for the transaction, and wherein a version of the particular row of the delta table that has not been applied to the index is included in the snapshot.

17. A system comprising:
   a processing unit;
   a database base table;
   an index maintenance group including:
      at least one index, wherein each index includes one or more specified columns of the database base table;
      a delta table indicating changes to one or more rows of the database base table; and
      an index control table indicating a last row of the delta table that has been applied to the at least one index; and
   an index maintenance module executable by the processing unit to asynchronously update a particular index of the index maintenance group according to one or more rows of the delta table.

18. The system of claim 17, wherein the index maintenance group includes at least one sub-index, wherein each sub-index comprises a group of adjacent rows of a respective index.

19. The system of claim 18, wherein updating the particular index of the index maintenance group includes updating a sub-index of the particular index.

20. The system of claim 18, wherein the particular index includes a plurality of columns of the database base table and the particular index includes a clustering key comprising a subset of the plurality of columns of the index, wherein division of the particular index into one or more sub-indexes is based on a prefix of the clustering key.

* * * * *